United States Patent
Zhang et al.

(10) Patent No.: US 12,095,637 B2
(45) Date of Patent: Sep. 17, 2024

(54) DEVICE MANAGEMENT METHOD, APPARATUS, SYSTEM, AND DEVICE, AND STORAGE MEDIUM

(71) Applicant: HUAWEI TECHNOLOGIES CO., LTD., Guangdong (CN)

(72) Inventors: Pufeng Zhang, Dongguan (CN); Qin Wu, Nanjing (CN); Wei Song, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/731,533

(22) Filed: Apr. 28, 2022

(65) Prior Publication Data

US 2022/0255818 A1  Aug. 11, 2022

Related U.S. Application Data

(63) Continuation of application No. PCT/CN2020/118221, filed on Sep. 28, 2020.

(30) Foreign Application Priority Data

Oct. 31, 2019 (CN) .......................... 201911055635.0

(51) Int. Cl.
*H04L 43/065* (2022.01)
*H04L 9/40* (2022.01)
(Continued)

(52) U.S. Cl.
CPC ........ *H04L 43/065* (2013.01); *H04L 41/0266* (2013.01); *H04L 43/0817* (2013.01); *H04L 63/0435* (2013.01)

(58) Field of Classification Search
CPC .............. H04L 43/065; H04L 41/0266; H04L 43/0817; H04L 63/0435; H04L 41/0846;
(Continued)

(56) References Cited

U.S. PATENT DOCUMENTS 10,148,506 B1 * 12/2018 Anburose ........... H04L 41/5006
10,200,248 B1 *  2/2019 Jiang ................... H04L 41/0879
(Continued)

FOREIGN PATENT DOCUMENTS

CN  102299812 A  12/2011
CN  105281940 A  1/2016
(Continued)

OTHER PUBLICATIONS

M. Bjorklund, Ed. et al., "Yang—A Data Modeling Language for the Network Configuration Protocol (NETCONF)", Internet Engineering Task Force (IETF), Request for Comments: 6020, Oct. 2010, total 173 pages.
(Continued)

*Primary Examiner* — Karen C Tang
(74) *Attorney, Agent, or Firm* — HUAWEI TECHNOLOGIES CO., LTD.

(57) ABSTRACT

This application discloses a device management method, apparatus, system, and device, and a storage medium. The method includes: obtaining, by a first network device, an extended YANG model file from a second network device, where the extended YANG model file includes a self-explanation tag, and the self-explanation tag is used to label network operation and maintenance data; obtaining the self-explanation tag from the extended YANG model file; and managing the second network device based on the self-explanation tag. The network operation and maintenance data is labeled by using the self-explanation tag. This facilitates device management such as data collection and is not prone to errors, thereby not only achieving relatively high management accuracy, but also improving management efficiency.

9 Claims, 11 Drawing Sheets

(51) Int. Cl.
*H04L 41/0266* (2022.01)
*H04L 43/0817* (2022.01)

(58) Field of Classification Search
CPC ......... H04L 41/14; H04L 43/08; H04L 41/00; H04L 41/04; H04W 12/37
USPC ........................................................ 709/217
See application file for complete search history.

(56) References Cited

U.S. PATENT DOCUMENTS

| | | | |
|---|---|---|---|
| 10,230,585 | B1 | 3/2019 | A et al. |
| 10,326,657 | B1* | 6/2019 | A ................... H04L 41/0859 |
| 2007/0121870 | A1 | 5/2007 | Herold et al. |
| 2016/0350095 | A1* | 12/2016 | Ramachandran ......... G06F 8/65 |
| 2017/0078158 | A1 | 3/2017 | Dec et al. |
| 2017/0270157 | A1* | 9/2017 | Porika ................ G06F 16/2423 |
| 2017/0339144 | A1* | 11/2017 | Han ..................... H04L 9/3268 |
| 2018/0131745 | A1 | 5/2018 | Shakir et al. |
| 2018/0270118 | A1* | 9/2018 | Lee .................... H04L 41/0897 |
| 2019/0132213 | A1* | 5/2019 | Na ..................... H04L 41/0226 |
| 2019/0140971 | A1* | 5/2019 | Guilbeault .......... H04L 41/0286 |
| 2019/0245740 | A1 | 8/2019 | Kachhla |

FOREIGN PATENT DOCUMENTS

| | | |
|---|---|---|
| CN | 105530115 A | 4/2016 |
| CN | 106209931 A | 12/2016 |
| CN | 106257868 A | 12/2016 |
| CN | 106301956 A | 1/2017 |
| CN | 106559251 A | 4/2017 |
| CN | 107302443 A | 10/2017 |
| CN | 108363545 A | 8/2018 |
| CN | 109144490 A | 1/2019 |
| CN | 109361550 A | 2/2019 |
| CN | 109412850 A | 3/2019 |
| CN | 109951315 A | 6/2019 |
| CN | 110018835 A | 7/2019 |
| CN | 112187525 A | 1/2021 |
| IN | 109033483 A | 12/2018 |
| JP | 6227195 B1 | 11/2017 |
| WO | 2018049677 A1 | 3/2018 |

OTHER PUBLICATIONS

A. Clemm et al., "Subscription to Yang Datastores, draft-ietf-netconf-yang-push-25", Intended status: standards Track, May 21, 2019, total 58 pages.
M. Bjorklund et al., "Yang Tree Diagrams", Internet Engineering Task Force (IETF), Request for Comments: 8340, Mar. 2018, total 13 pages.
M. Bjorklund et al., "Network Management Datastore Architecture (NMDA)", Internet Engineering Task Force (IETF), Request for Comments: 8342, Mar. 2018, total 44 pages.
C. Hopps et al.,"Yang Module Tags, draft-ietf-netmod-module tags-09", Updates: 8407, Sep. 25, 2019, total 18 pages.
M. Bjorklund et al., "NETCONF Extensions to Support the Network Management Datastore Architecture", Internet Engineering Task Force (IETF), Request for Comments: 8526, Mar. 2019, total 23 pages.
B. Lengyel et al., "Yang-Push Notification Capabilities, draft-ietf-netconf-notification-capabilities-05", Intended status: standards Track, Oct. 23, 2019, total 19 pages.
A. Clemm et al., "Subscription to Yang Notifications for Datastore Updates", Internet Engineering Task Force (IETF), Request for Comments: 8641, Sep. 2019, total 58 pages.
Q. Wu et al., "Self-explanation data Node tag capability, draft-tao-netconf-notif-node tag-capabilities-02", Intended status: standards Track, Jul. 8, 2020, total 15 pages.
Q. Wu et al., "Telemetry Data Self Explanation Tags, draft-tao-netmod-yang-node -tags-03", Intended status: standards Track, Jul. 8, 2020, total 30 pages.

* cited by examiner

DEVICE MANAGEMENT METHOD, APPARATUS, SYSTEM, AND DEVICE, AND STORAGE MEDIUM

CROSS-REFERENCE TO RELATED APPLICATIONS

This application is a continuation of International Application No. PCT/CN2020/118221, filed on Sep. 28, 2020, which claims priority to Chinese Patent Application No. 201911055635.0, filed on Oct. 31, 2019. The disclosures of the aforementioned applications are hereby incorporated by reference in their entireties.

TECHNICAL FIELD

This application relates to the field of communications technologies, and in particular, to a device management method, apparatus, system, and device, and a storage medium.

BACKGROUND

As a scale of devices in a software defined network (SDN) network increases and more services are carried on the SDN network, higher requirements are posed on intelligent operation and maintenance of the SDN network, including monitoring data with higher precision, to detect and quickly adjust microburst traffic in a timely manner. In addition, impact of a monitoring process on device functions and performance needs to be minimized, to improve device and network utilization. To meet operation and maintenance requirements, how to perform device management becomes a problem to be resolved urgently.

SUMMARY

Embodiments of this application provide a device management method, apparatus, system, and device, and a storage medium, to resolve a problem in a related technology. The technical solutions are as follows:

According to a first aspect, a device management method is provided. The method includes: obtaining, by a first network device, an extended YANG model file from a second network device, where the extended YANG model file includes a self-explanation tag, and the self-explanation tag is used to label network operation and maintenance data; obtaining the self-explanation tag from the extended YANG model; and managing the second network device based on the self-explanation tag.

The network operation and maintenance data is labeled by using the self-explanation tag. This facilitates device management such as data collection and is not prone to errors, thereby not only achieving relatively high management accuracy, but also improving management efficiency.

In an embodiment, the managing the second network device based on the self-explanation tag includes: determining an extensible markup language path language (XPATH) path of a collection object in the second network device based on the self-explanation tag, where the XPATH of the collection object is used to describe an obtaining path of the collection object in the YANG model file; sending a subscription request of the collection object to the second network device based on the XPATH path of the collection object; and receiving information about the collection object that is sent by the second network device.

In an embodiment, the determining an XPATH path of a collection object in the second network device based on the self-explanation tag includes: obtaining a network element driver package of the second network device based on the self-explanation tag, where the network element driver package is used to describe collection-related information of the second network device; and determining the XPATH path of the collection object in the second network device based on the collection-related information of the second network device.

In an embodiment, the obtaining a network element driver package of the second network device based on the self-explanation tag includes: receiving collection capability notification information sent by the second network device, where the collection capability notification information is used to indicate a mechanism capability of the second network device; and generating the network element driver package of the second network device based on the self-explanation tag and the mechanism capability of the second network device.

According to a second aspect, a device management method is provided. The method includes: obtaining, by a second network device, an extended YANG model file, where the extended YANG model file includes a self-explanation tag, and the self-explanation tag is used to label network operation and maintenance data; and sending information about the extended YANG model file to the first network device.

In an embodiment, the sending information about the extended YANG model file to the first network device includes: sending the extended YANG model file to the first network device, or sending a location of the extended YANG model file to the first network device.

In an embodiment, after the sending information about the extended YANG model file to the first network device, the method further includes: receiving a subscription request of a collection object that is sent by the first network device; and sending information about the collection object to the first network device based on the subscription request.

In an embodiment, the method further includes: sending collection capability notification information to the first network device, where the collection capability notification information is used to indicate a mechanism capability of the second network device.

According to a third aspect, a device management apparatus is provided. The apparatus is used in a first network device, and the apparatus includes:

an obtaining module, configured to obtain an extended yet another next generation YANG model file from a second network device, where the extended YANG model file includes a self-explanation tag, and the self-explanation tag is used to label network operation and maintenance data;

a reading module, configured to obtain the self-explanation tag from the extended YANG model file; and a management module, configured to manage the second network device based on the self-explanation tag.

In an embodiment, the management module is configured to: determine an XPATH path of a collection object in the second network device based on the self-explanation tag, where the XPATH of the collection object is used to describe an obtaining path of the collection object in the YANG model file; send a subscription request of the collection object to the second network device based on the XPATH path of the collection object; and receive information about the collection object that is sent by the second network device.

In an embodiment, the management module is configured to: obtain a network element driver package of the second network device based on the self-explanation tag, where the network element driver package is used to describe collection-related information of the second network device; and determine the XPATH path of the collection object in the second network device based on the collection-related information of the second network device.

In an embodiment, the management module is configured to: receive collection capability notification information sent by the second network device, where the collection capability notification information is used to indicate a mechanism capability of the second network device; and generate the network element driver package of the second network device based on the self-explanation tag and the mechanism capability of the second network device.

According to a fourth aspect, a device management apparatus is provided. The apparatus is used in a second network device, and the apparatus includes:

an obtaining module, configured to obtain an extended yet another next generation YANG model file, where the extended YANG model file includes a self-explanation tag, and the self-explanation tag is used to label network operation and maintenance data; and a sending module, configured to send information about the extended YANG model file to the first network device.

In an embodiment, the sending module is configured to send the extended YANG model file to the first network device, or send a location of the extended YANG model file to the first network device.

In an embodiment, the apparatus further includes:

a receiving module, configured to receive a subscription request of a collection object that is sent by the first network device, where the sending module is further configured to send information about the collection object to the first network device based on the subscription request.

In an embodiment, the sending module is further configured to send collection capability notification information to the first network device, where the collection capability notification information is used to indicate a mechanism capability of the second network device.

In any one of the foregoing embodiments, the mechanism capability of the second network device includes one or more of a subscription mode of the second network device, a reporting protocol, an encryption protocol, an encoding/decoding mode, a supported collection object, information indicating whether conditional subscription is supported, a subscription condition, a quantity of supported sensors, and a quantity of XPATH paths to which each sensor can subscribe.

According to a fifth aspect, a first network device is further provided. The first network device is configured to perform the method according to any one of the first aspect.

According to a sixth aspect, a second network device is further provided. The second network device is configured to perform the method according to any one of the second aspect.

According to a seventh aspect, a device management system is provided. The system includes a first network device and a second network device; and the first network device performs the method according to any one of the first aspect, and the second network device performs the method according to any one of the second aspect.

According to an eighth aspect, a network device is further provided. The device includes a memory and a processor. The memory stores at least one instruction; and the processor loads and executes the at least one instruction, to implement the method according to either the first aspect or the second aspect.

According to a ninth aspect, a computer-readable storage medium is further provided. The storage medium stores at least one instruction, and the processor loads and executes the instruction, to implement the method according to either the first aspect or the second aspect.

Another communications apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive and send a signal. In addition, when the processor executes the instructions stored in the memory, the processor is enabled to perform the method in any one of the foregoing possible implementations.

In an embodiment, there are one or more processors, and there are one or more memories.

In an embodiment, the memory may be integrated with the processor, or the memory and the processor are disposed separately.

In a specific implementation process, the memory may be a non-transitory memory, for example, a read-only memory (ROM). The memory and the processor may be integrated on a same chip, or may be separately disposed on different chips. A type of the memory and a manner of disposing the memory and the processor are not limited in this embodiment of this application.

A computer program (product) is provided. The computer program (product) includes computer program code. When the computer program code is run on a computer, the computer is enabled to perform the methods in the foregoing aspects.

A chip is provided. The chip includes a processor, configured to invoke, from a memory, instructions stored in the memory and run the instructions, to enable a communications device on which the chip is installed to perform the methods in the foregoing aspects.

Another chip is provided. The chip includes an input interface, an output interface, a processor, and a memory. The input interface, the output interface, the processor, and the memory are connected to each other through an internal connection channel. The processor is configured to execute code in the memory. When the code is executed, the processor is configured to perform the methods in the foregoing aspects.

DESCRIPTION OF EMBODIMENTS

Terms used in the embodiments of this application are merely used to explain specific embodiments of this application, but are not intended to limit this application.

As a scale of devices in an SDN network increases and more services are carried on the SDN network, higher requirements are posed on intelligent operation and maintenance of the SDN network, including monitoring data with higher precision, to detect and quickly adjust microburst traffic in a timely manner. In addition, impact of a monitoring process on device functions and performance needs to be minimized, to improve device and network utilization.

A Telemetry technology can meet the foregoing requirements. The Telemetry technology supports an intelligent operation and maintenance system in managing more devices, and monitoring data with higher precision and higher real-time performance. A monitoring process has little impact on device functions and performance. This provides the most important big data basis for fast network problem locating and network quality optimization and adjustment. Network quality analysis is converted into big data analysis, which effectively supports intelligent operation and maintenance. Therefore, the Telemetry technology is increasingly widely applied.

Figure 1:
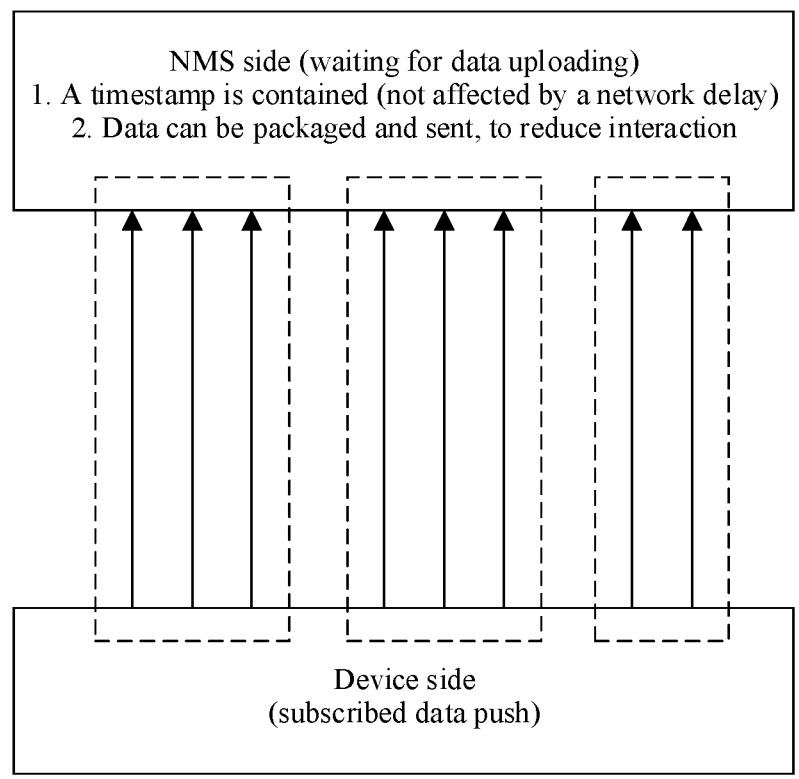
FIG. 1 is a schematic diagram of a Telemetry push mode according to an embodiment of this application.

Currently, in the Telemetry technology in a push mode, a network device can automatically push data to an NMS (network monitoring system) side in a periodic or dynamic change-triggering manner, thereby avoiding repeated query and improving monitoring performance. For example, a push process is shown in FIG. 1. A device side pushes subscribed data to the NMS side, and the NMS side waits for the data sent by the device side. The data sent by the device side may include a timestamp, to avoid impact of a network delay. In addition, the device side may package the data and send the data, to reduce interaction between the NMS side and the device side.

Figure 2:
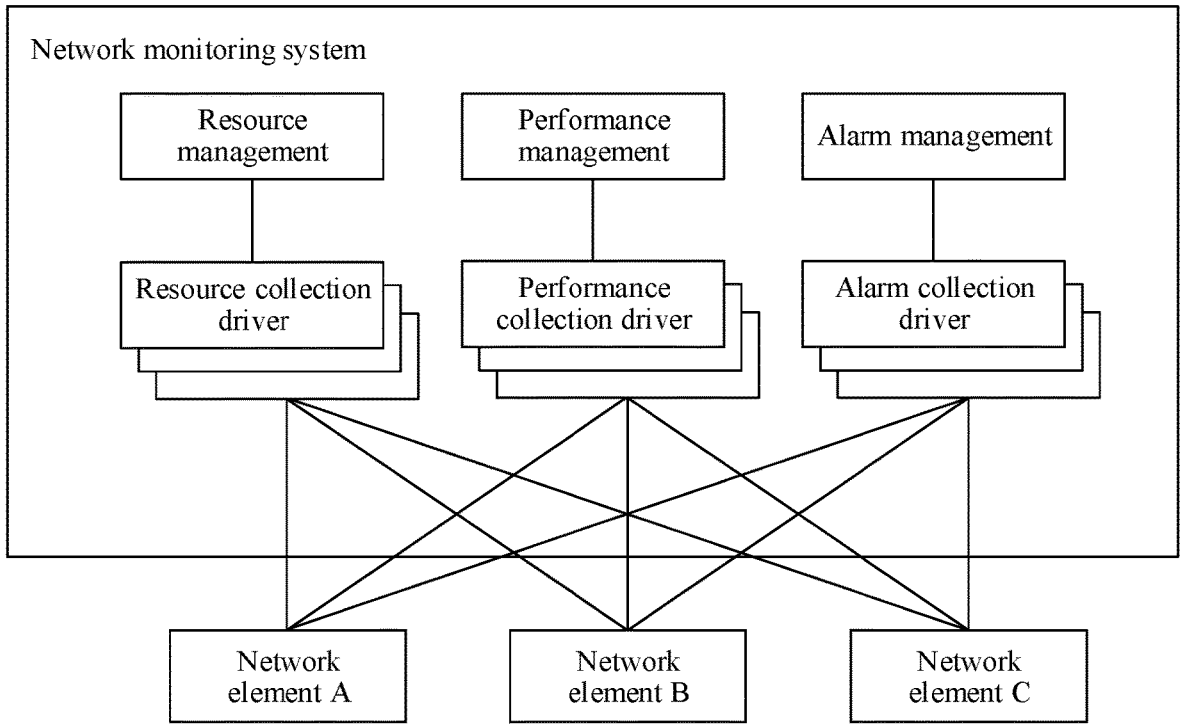
FIG. 2 is a schematic diagram of a structure of a network monitoring system according to an embodiment of this application.

The NMS side monitors and manages, by using a network monitoring system, the data pushed by the device side. A network monitoring system shown in FIG. 2 is used as an example. The NMS side is connected to devices of different vendors, types, and versions by using the network monitoring system to collect various types of network operation and maintenance data. Device models and interfaces of different vendors, types, and versions vary greatly. Therefore, the network monitoring system has a driver layer. The driver layer is used to complete collection and adaption, to classify and collect device operation and maintenance data and convert the data into a unified model.

To classify and collect the data, usually, a configuration file is manually compiled to complete device matching. However, the upper-layer network monitoring system needs to be connected to various devices, with varying capabilities, of different vendors, types, and versions. When a device vendor launches a new feature, device model, and version, the device vendor needs to manually compile a configuration file on the upper-layer network monitoring system for matching. This is inefficient and error-prone. In addition, the upper-layer network monitoring system further needs to cooperate with the device to release a version, leading to low efficiency.

In view of this, the embodiments of this application provide a device management method. According to the method, Telemetry operation and maintenance data can be automatically labeled and dynamically learned, to change a complex Telemetry collection and matching process from a manual process to an automatic process. In this way, when the device supports a new object type, property, and metric, and the like, Telemetry matching does not need to be manually performed on the upper-layer network monitoring system. Instead, dynamic learning is performed.

In addition, a yet another next generation (YANG) model is a language defined by the Internet Engineering Task Force (IETF) standards organization to model network configuration and management data. Because the YANG model supports complete description of data between a NETCONF client and a NETCONF server, the YANG model is used to describe configuration data, status data, a remote procedure call (RPC), and a notification that are exchanged between the NETCONF client and the NETCONF server. Therefore, in the embodiments of this application, a manner of managing the device based on the YANG model is used.

Figure 3:
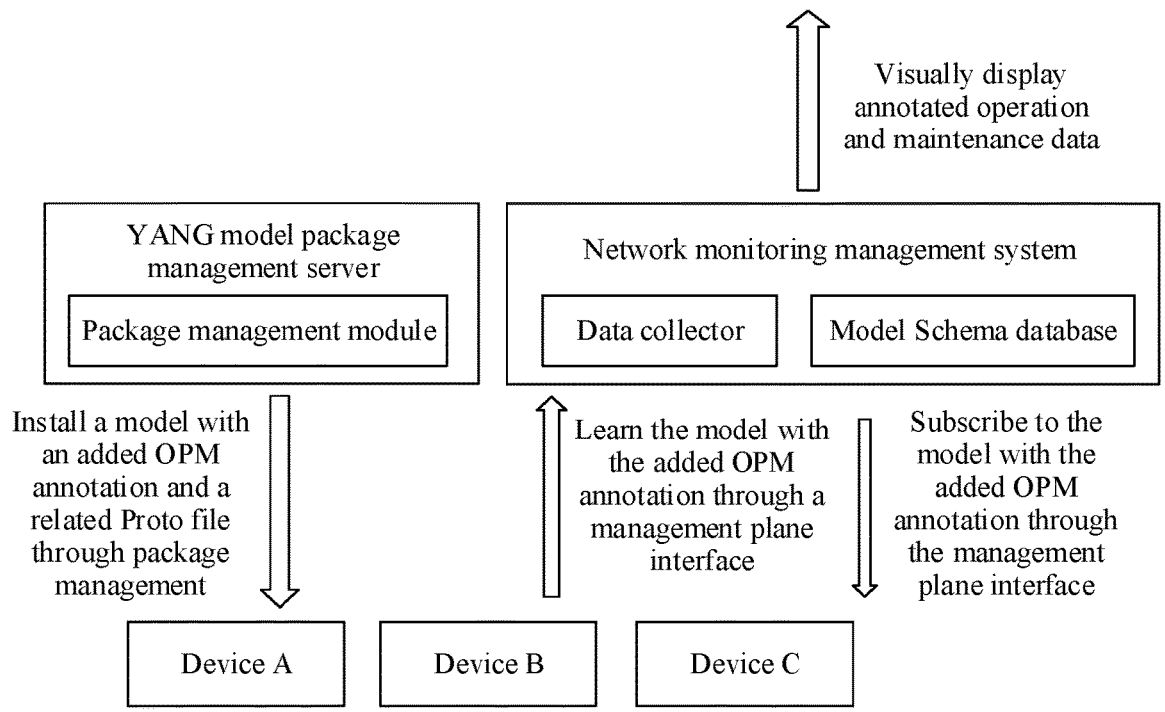
FIG. 3 is a schematic diagram of a structure of a device management system according to an embodiment of this application.

The device management method provided in the embodiments of this application may be applied to a device management system shown in FIG. 3. The device management system includes a package management service system and a network monitoring management system on the NMS side and a device A, a device B, and a device C on the device side. It should be noted that, in FIG. 3, only the device A, the device B, and the device C on the device side are used as an example for description, and a quantity of devices is not limited in the embodiments of this application. In addition, the package management service system and the network monitoring management system may be deployed on one network device, or may be deployed on different network devices. A manner of deploying the package management service system and the network monitoring management system is not limited in the embodiments of this application either.

The package management service system is responsible for, but not limited to, management of a YANG model file and a protocol (proto) file package, for example, management such as creation, deletion, and modification. The network monitoring management system is responsible for, but not limited to, learning a service YANG file that is based on an object type, property and metric (OPM) model annotation, extracting the OPM model annotation and an extensible markup language path language (XPATH) corresponding to a collection object, listening to a Telemetry capability notification of a managed device, and subscribing to the collection object based on the OPM model annotation of the managed device. The managed device is configured to perform, but not limited to, the following operations: receiving a package management request from a YANG model package management service system, detecting impact of package management on a device version, receiving a subscription request from the network monitoring management system, and receiving a YANG model Schema query request.

Figure 4:
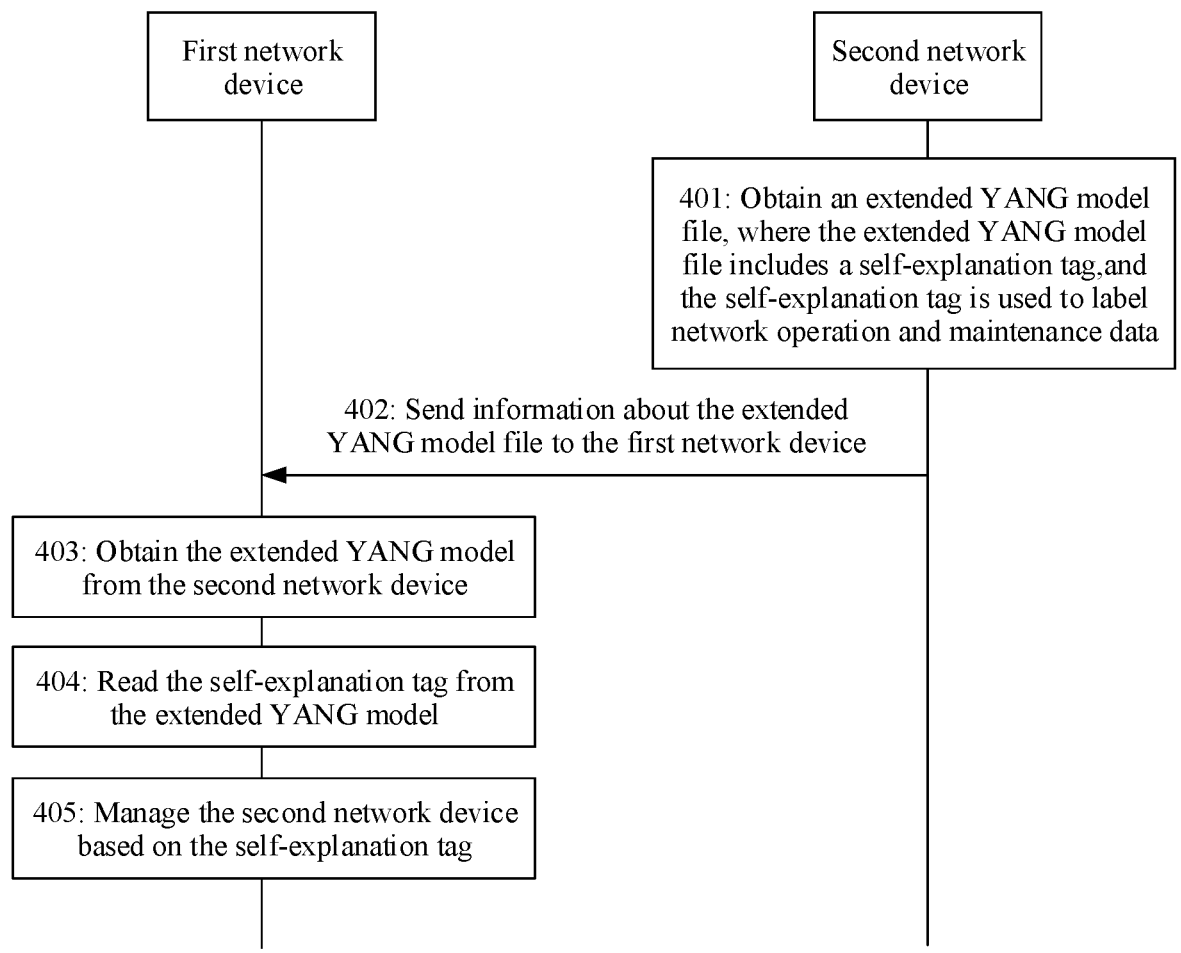
FIG. 4 is a flowchart of a device management method according to an embodiment of this application.

Next, with reference to an implementation environment shown in FIG. 3, an example in which a device on the NMS side is a first network device and a device on the device side is a second network device is used to describe the device management method provided in the embodiments of this application. Refer to FIG. 4. The method includes the following several processes.

At block 401, the second network device obtains an extended YANG model file, where the extended YANG model file includes a self-explanation tag, and the self-explanation tag is used to label network operation and maintenance data.

In an embodiment of this application, the extended YANG model file is the foregoing service YANG file that is based on the OPM model annotation and that is shown in FIG. 3. The OPM model annotation is the self-explanation tag included in the extended YANG model file, and the OPM model annotation includes but is not limited to the following content:

- an object type (O): including an object type ID (e.g., globally unique ID), a name, a description, and the like;
- a property (P): including a property ID (e.g., unique within an object type), a name, a description, a data type (for example, a string or an integer), a length, a primary key, an enumerated value, and the like; and
- a metric (M): including a metric type (performance, an alarm, a status, and the like), a metric ID (unique within an object type), a name, a description, a unit, a data type, a value range, a time aggregation type, and the like.

Figure 5:
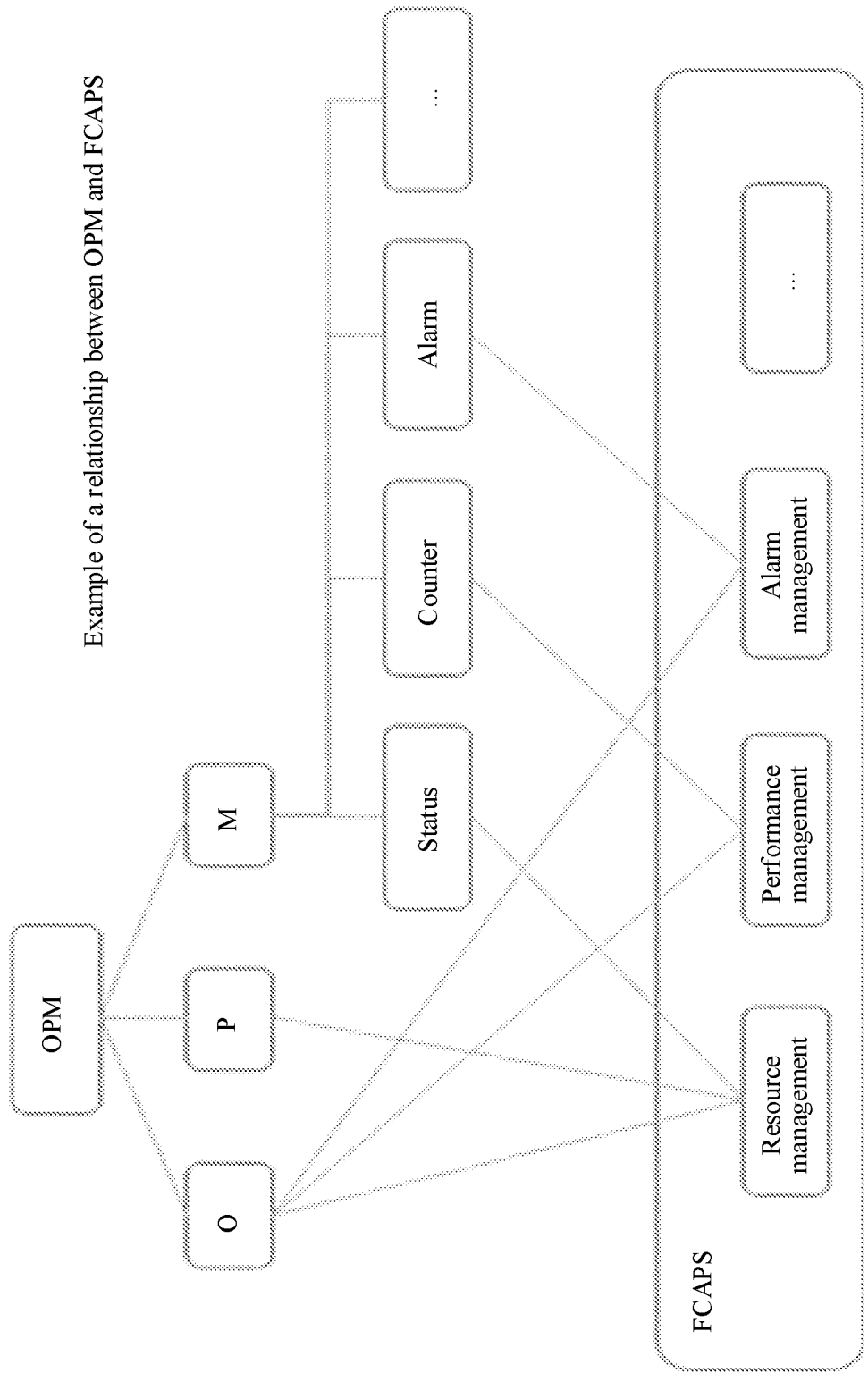
FIG. 5 is a schematic diagram of a relationship between OPM and FCAPS according to an embodiment of this application.

For example, FIG. 5 shows a correspondence between OPM and fault, configuration, accounting, performance, security (FCAPS). FCAPS is five basic functions of a network management system proposed by the International Telecommunication Union-Telecommunication Standardization Sector (ITU-T), and is also five standards for the network management work. It can be learned from FIG. 5 that, the object type in OPM corresponds to a resource management object, a performance management object, and an alarm management object in an FCAPS model; the property in OPM corresponds to the resource management object in the FCAPS model and is used to describe an object property; and the metric in OPM corresponds to a status, statistics, an alarm, and the like in the FCAPS model.

The extended YANG model file may be obtained by the second network device from the package management service system, or may be directly configured by a network administrator on the second network device. A manner in which the second network device obtains the extended YANG model file is not limited in the embodiments of this application. Regardless of a manner of obtaining the extended YANG model file, the extended YANG model file includes the self-explanation tag, and the self-explanation tag is used to label the network operation and maintenance data.

For example, extension may be performed in a service YANG model, and the extended YANG model file is obtained in a manner of classifying and labeling the network operation and maintenance data. For example, extension content of YANG syntax is as follows:

```
module opm-extension {
    namespace "urn:foo:yang:opm-extension";
    prefix opmext;
    extension agg-type {
        argument value;
        description "The time aggregation type of status data, include avg/sum/max/min.";
    }
    extension opm-type {
        argument value;
        description "OPM is the contraction of Object type, Property and Metric. It is the abstraction way of network domain model.";
    }
    extension name {
        argument value;
        description "The brief description.";
    }
}
```

Based on the foregoing extension of the YANG syntax, content of the obtained extended YANG model file may be as follows:

```
module foo-ifm {
    container interfaces {
        opmext:opm-type "object type";
        opmext:name "Interface";
        ...
        list interface {
            leaf ifName {
                type pub-type:ifName;
                opmext:opm-type "property";
                opmext:name "Interface Name";
            }
            leaf ifStatiEnable {
                type boolean;
                ...
            }
            ...
            container ifStatistics {
                opmext:opm-type "metric";
                when "../ifStatiEnable ='true'"; //enabling statistics are
defined through a WHEN statement
                leaf receiveByte {
                    type uint64;
                    opmext:name "Receive Byte";
                    opmext:agg-type "sum";
                }
                ...
```

Figure 6:
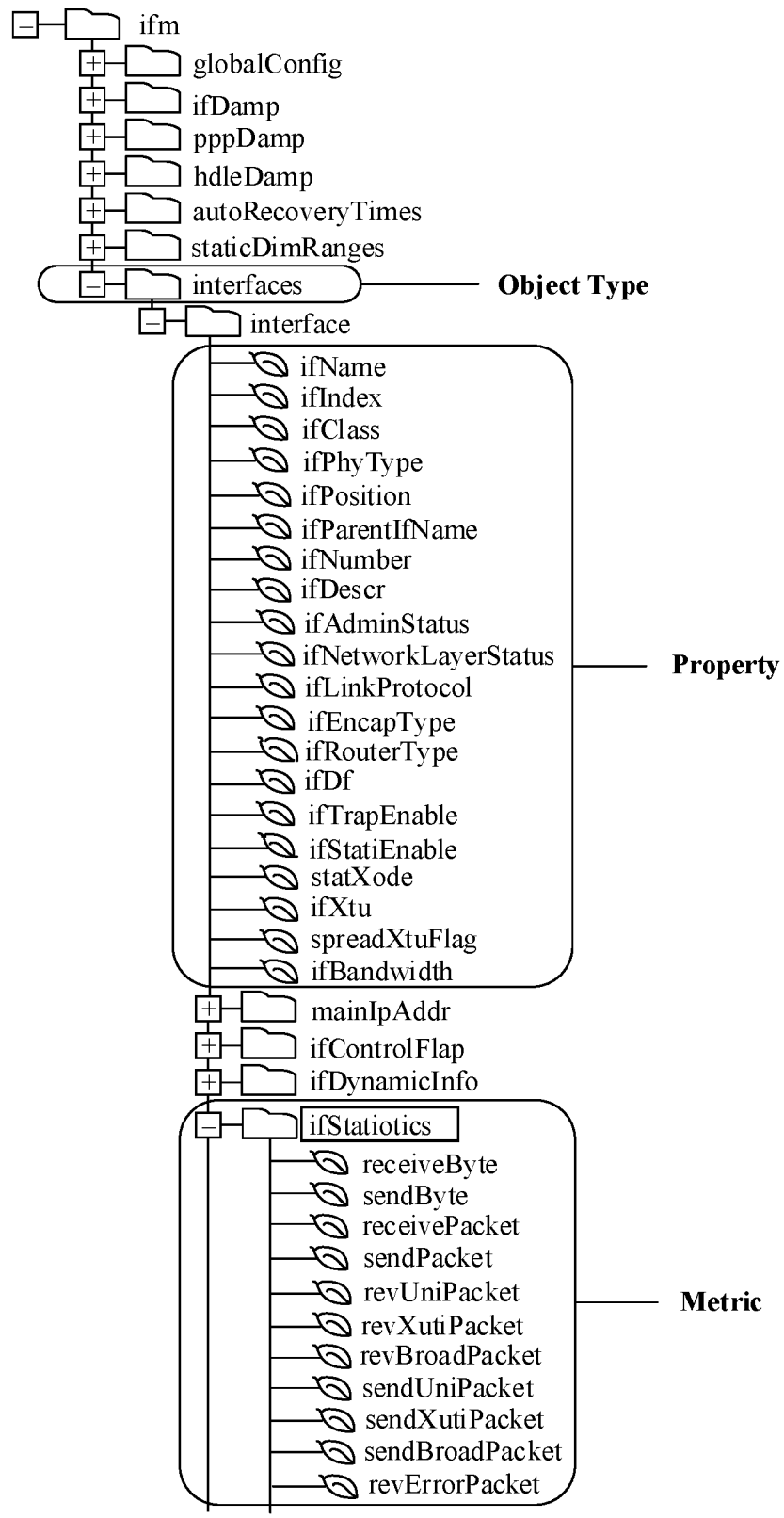
FIG. 6 is a schematic diagram of a structure of a visually extended YANG model according to an embodiment of this application.

After the service YANG model file is labeled through the foregoing OPM extension, the extended YANG model file is visualized, and a display manner is shown in FIG. 6. It can be learned from FIG. 6 that, a structure named "Interfaces" in the YANG model is labeled with Object type, a name leaf node ifName and the like of a name "interface" in the YANG model are labeled with Property, and ifStatistics in the YANG model is labeled with Metric.

In addition to obtaining the extended YANG model file in a manner of performing extension in the service YANG model and classifying and labeling the network operation and maintenance data, the method provided in the embodiments of this application further supports obtaining the extended YANG model file in a manner of extending a node tag based on an ietf module tag. For example, the following node tag module structure is used as an example:

```
module: ietf-data-node-tag
  augment /tags:module-tags/tags:module:
    +--rw module-tags
      +--rw module*[name]
        +--rw name                yang:yang-identifier
        +--rw tag*                tag
        +--rw masked-tag*         tag
        +--rw node-tags*[node-selector]
          +--rw node-selector  nacm:node-instance-identifier
          +--rw tag*              tag
          +--rw masked-tag*       tag
```

After an OPM tag is extended, an obtained structure is as follows:

```
module ietf-data-node-tag{
    import module-tags{prefix tags;}
    ntags:nde-tag "ietf:object-type";
    ntags:nde-tag "ietf:property";
    ntags:nde-tag "ietf:metric";
}
```

Based on the foregoing extension of the OPM tag, the obtained extended YANG model file may be as follows:

```
<t:module-tags xmlns:t="urn:ietf:params:xml:ns:yang:ietf-module-tags">
  <t:module>
    <t:name>foo-ifm</t:name>
    <t:node-tags>
      <t:node-selector>/ifm:ifm/ifm:interfaces/ifm:interface</t:node-selector>
      <t:tag>ietf:object-type</t:tag>
    <t:node-tags>
    <t:node-tags>
      <t:node-selector>/ifm:ifm/ifm:interfaces/ifm:interface/ifm:ifName</t:node-selector>
      <t:tag>ietf:property</t:tag>
    <t:node-tags>
    <t:node-tags>
      <t:node-selector>/ifm:ifm/ifm:interfaces/ifm:interface/ifm:ifStatistics</t:node-selector>
      <t:tag>ietf:metric</t:tag>
    </t:node-tags>
  </t:module>
</t:module-tags>
```

The extended YANG model file obtained in the foregoing manner of extending the node tag based on the ietf module tag may be still visually displayed, as shown in FIG. 6. Network monitoring data can be visualized in real time to quickly respond to network operation and maintenance requirements.

At block 402, the second network device sends information about the extended YANG model file to the first network device.

After the second network device obtains the extended YANG model file, the second network device sends the obtained extended YANG model file to the first network device, so that the first network device learns the extended YANG model file. For example, the second network device may send the extended YANG model file to the first network device through a management plane interface.

In an embodiment, in addition to directly sending the extended YANG model file to the first network device, the second network device may further send a location of the extended YANG model file, so that the first network device obtains the extended YANG model file based on the location.

At block 403, the first network device obtains the extended YANG model file from the second network device.

As described in block 402 above, the second network device may send the extended YANG model file to the first network device through the management plane interface, so that the first network device obtains the extended YANG model file from the second network device through the management plane interface.

If the second network device sends the location of the extended YANG model file, the first network device obtains the extended YANG model file based on the location.

At block 404, the first network device obtains the self-explanation tag from the extended YANG model file.

After obtaining the extended YANG model file, the first network device obtains the self-explanation tag from the extended YANG model file. Because different versions of a same service YANG file are uploaded for different device types and versions, in this embodiment of this application, after obtaining the extended YANG model file, the first network device may extract an OPM model, that is, the self-explanation tag, from the extended YANG model file by using a highest version as a baseline.

At block 405, the first network device manages the second network device based on the self-explanation tag.

Figure 7:
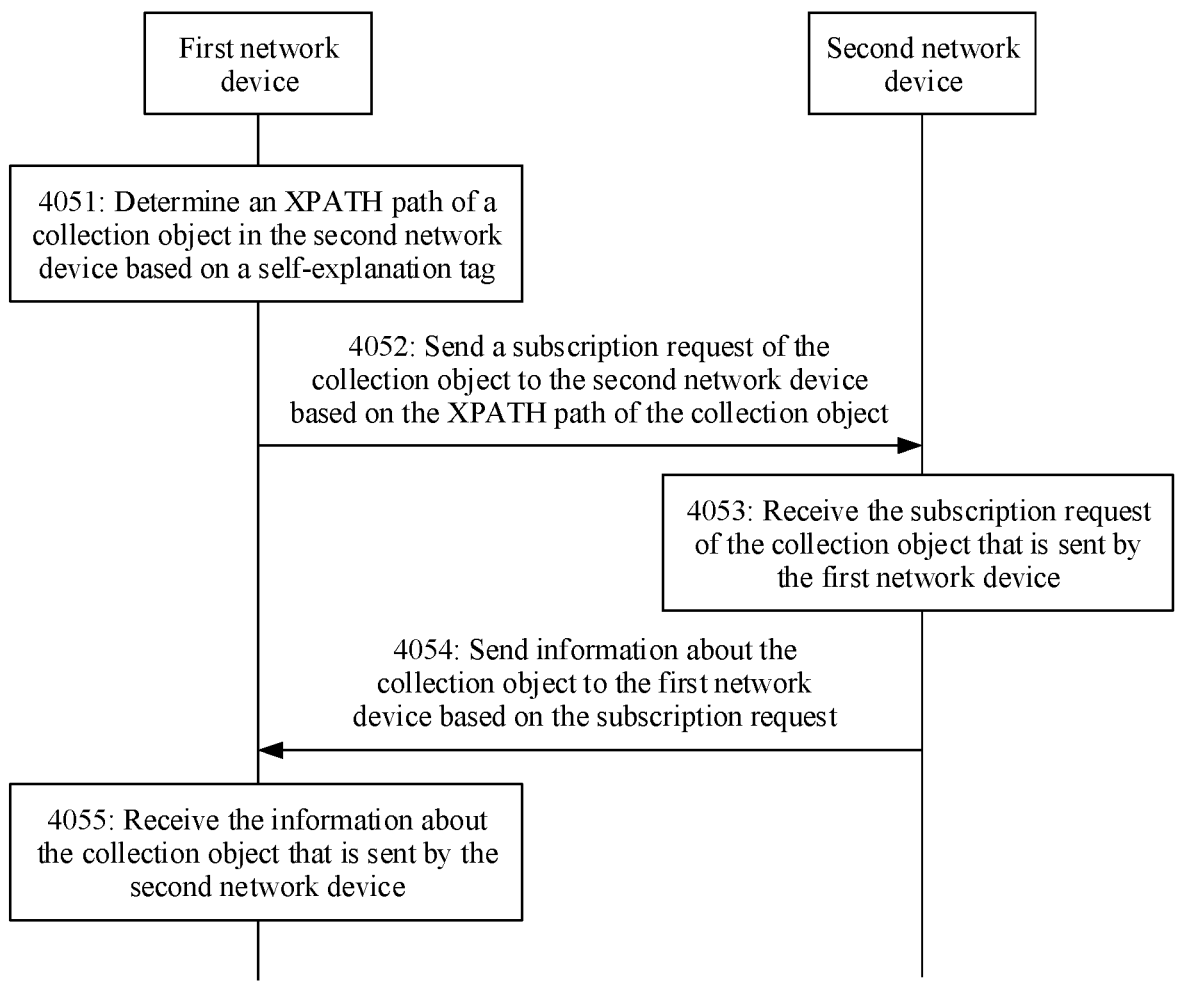
FIG. 7 is a schematic interaction diagram of a data collection process according to an embodiment of this application.

An example in which data collection management is performed on the second network device by using the self-explanation tag is used. Refer to FIG. 7. There are the following several processes for the data collection management.

At block 4051, the first network device determines an XPATH path of a collection object in the second network device based on the self-explanation tag.

In an embodiment, the self-explanation tag includes the XPATH path of the collection object, and the XPATH of the collection object is used to describe an obtaining path of the collection object in the YANG model file. Therefore, the XPATH path of the collection object in the second network device may be directly determined based on the self-explanation tag.

In addition, the second network device may further perform capability negotiation with the first network device. In a process of performing capability negotiation, if a mechanism capability of the second network device is notified to the first network device, the first network device performs more accurate management on the second network device in a more targeted manner.

In an embodiment, the method further includes: The second network device sends collection capability notification information to the first network device, where the collection capability notification information is used to indicate the mechanism capability of the second network device.

An occasion on which the second network device sends the collection capability notification information to the first network device is not limited in this embodiment of this application. For example, when detecting that a YANG model version changes, the second network device may be triggered to send the collection capability notification information to the first network device. For example, the collection capability notification information may alternatively be periodically sent.

Regardless of the occasion on which the collection capability notification information is sent, for example, the mechanism capability of the second network device includes one or more of a subscription mode (for example, static subscription or dynamic subscription) of the second network device, a reporting protocol (for example, gRPC or the UDP), an encryption protocol, an encoding/decoding mode (gpb or gpbkv), a supported collection object, information indicating whether conditional subscription is supported, a subscription condition, a quantity of supported sensors, and a quantity of extensible markup language path language XPATH paths to which each sensor can subscribe. In addition, the mechanism capability may further include a hierarchical capability model of the second network device, for example, a global-level parameter, a datastore dataset parameter, or a node-level parameter of the second network device. In the hierarchical capability model, definition of a lower-level capability covers an upper level. That is, the upper level and a lower level have a same capability. In addition to having a capability of the upper level, the lower level further has a specific capability.

The mechanism capability may be negotiated by using a model. For example, an example in which Telemetry capability negotiation is performed by using the YANG model is used. A structure of the YANG may be as follows:

```
module: telemetry-capabilities
    +— ro datastore-subscription-capabilities
        +— ro (update-period) ?
        |  +—: (minimum-update-period)
        |  |   +— ro minimum-update-period ?         uint 32
        |  +—: (supported-update-period)
        |      +— ro supported-update-period *       uint 32
        +— ro max-objects-per-update ?               uint 32
        +— ro minimum-dampening-period ?             uint 32
        +— ro max-sensors ?                          uint 32
        +— ro max-xpaths-per-sensor ?                uint 32
        +— ro supported-subscription-type *          identityref
        +— ro supported-protocol *                   identityref
        +— ro supported-encryption *                 identityref
        +— ro supported-encoding *                   identityref
        +— ro datastore-capabilities * [datastore]
            +— ro datastore                          union
            +— ro (update-period) ?
            |  +—: (minimum-update-period)
            |  |   +— ro minimum-update-period ?     uint 32
            |  +—: (supported-update-period)
            |      +— ro supported-update-period *   uint 32
            +— ro max-objects-per-update ?           uint 32
            +— ro minimum-dampening-period ?         uint 32
            +— ro max-xpaths-per-sensor ?            uint 32
            +— ro on-change-supported-for-config ?   boolean
            +— ro on-change-supported-for-state ?    boolean
            +— ro per-node-capabilities * [node-selector]
                +— ro node-selector                  nacm: node-i:
                +— ro (update-period) ?
                |  +—: (minimum-update-period)
                |  |   +— ro minimum-update-period ? uint 32
                |  +—: (supported-update-period)
                |      +— ro supported-update-period * uint 32
                +— ro max-objects-per-update ?       uint 32
                +— ro minimum-dampening-period ?     uint 32
                +— ro max-xpaths-per-sensor ?        uint 32
                +— ro (conditional-subscription) ?
                |  +— ro conditional-supported       boolean
                |  +— ro conditions *                string
                +— ro on-change-supported            boolean
```

In the YANG model used to negotiate the mechanism capability, max-sensors indicates the quantity of supported sensors, max-xpaths-per-sensor indicates the quantity of XPTH paths to which each sensor can subscribe, supported-subscription-type indicates a supported subscription type, supported-protocol indicates the reporting protocol, supported-encryption indicates the encryption protocol, and supported-encoding indicates the encoding/decoding mode.

For example, max-sensors indicates that the quantity of supported sensors is 10, max-xpaths-per-sensor indicates that the quantity of XPTH paths to which each sensor can subscribe is 5, supported-subscription-type indicates that the supported subscription type is dynamic and static, supported-protocol indicates that the reporting protocol is gRPC and the UDP, supported-encryption indicates that the encryption protocol is SSL 3.0 and TLS 1.0, and supported-encoding indicates that the encoding/decoding mode is GBP and JSON. In this case, based on the YANG model for capability negotiation, a YANG instance may be as follows:

```
<datastore-subscription-capabilities
xmlnsorn:left:params:xml:ns:yang:telemetry-capabilities>
  <minimum-update-period>500</minimum-update-period >
  <max-objects-per-update>2000</ max-objects-per-update >
  <minimum-dampening-period>100</minimum- dampening -period >
  <max-sensors>10</ max-sensors >
  <max-xpaths-per- sensors >5</ max-xpaths-per- sensors>
  <supported- subscription -type>
    < subscription -type >dynamic</ subscription -type>
    < subscription -type >static</ subscription -type>
  </ supported- subscription -type >
  < supported-protocol>
    <protoool>grpo</protoool>
    <protoool>adp</protoool>
  </ supported-protoool>
  < supported-encryption>
    < encryption >ssl 3.0</ encryption>
    < encryption >tls 1.0</ encryption>
  </ supported- encryption>
  < supported-encoding>
    < encoding >gbp</ encoding>
    < encoding >json</ encoding>
  </ supported- encoding >
  <datastore-capabilities>
    <datastore xmlnsorn:left:params:xml:ns:yang:letf-datastores>
      operational
    </datastore>
    <on-change-supported-for-state>true</ on-change-supported-for-state>
    <per-node- capabilities>
      <node-selector>/devm:devm/devm:cpuInfos</ node-selector>
      <minimum-update-period>10</ minimum-update-period>
    </per-node- capabilities>
    <per-node- capabilities>
      <node-selector>/devm:devm/devm:memoryInfos</node-selector>
      <minimum-update-period>10</minimum-update-period>
      <on-change-supported>false</on-change-supported>
    </per-node- capabilities>
    <per-node- capabilities>
      <node-selector>/ifm:ifm/ifm:interfaces/ifm:interface</node-selector>
    </per-node- capabilities>
    <per-node- capabilities>
      <node-selector>/ifm:ifm/ifm:interfaces/ifm:interface/ifm:ifStatisitcs</node-selector>
      <minimum-update-period>10</ minimum-update-period>
      <conditional-subscription>
        <conditional-supported>true</ conditional-supported >
        <conditions>ifName</conditions>
      </ conditional-subscription>
      <on-change-supported>false</on-change-supported>
    </per-node-capabilities>
  </datastore-capabilities>
</datastore-subscription-capabilities>
```

In an embodiment, the obtaining a network element driver package of the second network device based on the self-explanation tag includes: The first network device receives the collection capability notification information sent by the second network device, where the collection capability notification information is used to indicate the mechanism capability of the second network device; and generates the network element driver package of the second network device based on the self-explanation tag and the mechanism capability of the second network device.

In an embodiment, that the first network device determines an XPATH path of a collection object in the second network device based on the self-explanation tag includes: obtaining the network element driver package of the second network device based on the self-explanation tag, where the network element driver package is used to describe collection-related information of the second network device; and determining the XPATH path of the collection object in the second network device based on the collection-related information of the second network device.

Figure 8:
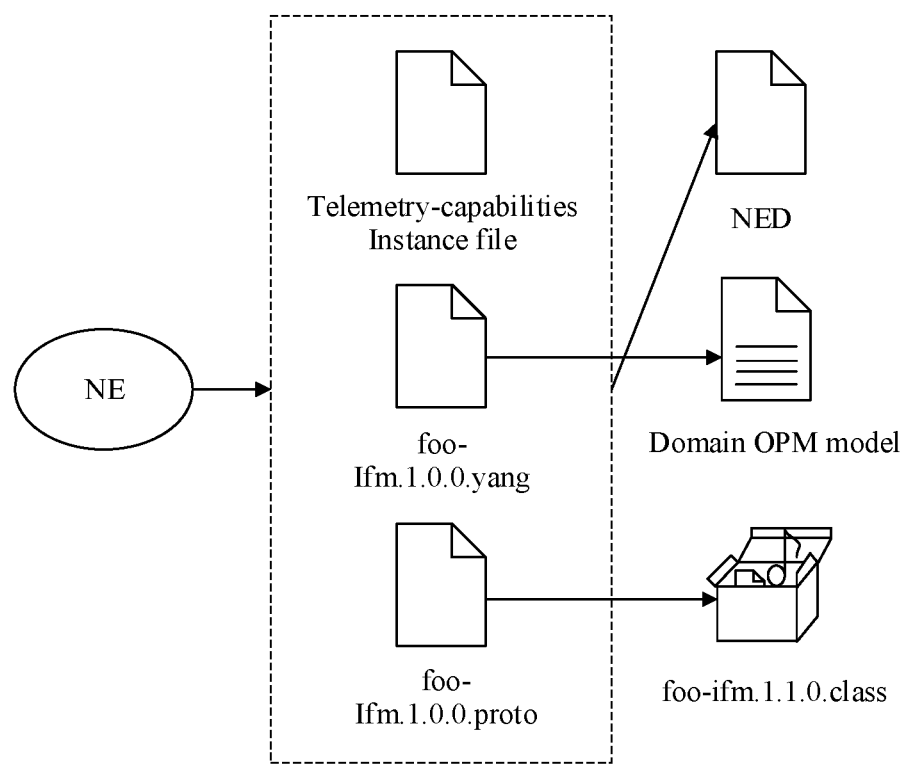
FIG. 8 is a schematic diagram of a process of conversion between an OPM model and an NED package according to an embodiment of this application.

FIG. 8 shows a process in which the network monitoring system converts a device model into an OPM model and a NED package. For the first network device, through Telemetry capability notification, the network monitoring system obtains a YANG node that supports Telemetry and a related mechanism capability of the second network device, and generates a NED package with reference to an OPM self-explanation tag. In addition, the network monitoring system compiles a class file online based on a device proto file. The class file is loaded when a collector is running, for GPB decoding.

The network element driver (NED) package describes Telemetry collection-related information of a network element at a granularity of a network element type and a version.

A Telemetry collection related model has an OPM annotation model and a Proto file, a corresponding XPATH, an XPATH configuration of enabling metric statistics collection, a measurement formula (if differentiated matching is required), and the like.

At block 4052, the first network device sends a subscription request of the collection object to the second network device based on the XPATH path of the collection object.

Because the first network device determines the XPATH path of the collection object, the first network device may send the subscription request of the collection object to the second network device based on the XPATH path of the collection object, to subscribe to information about the collection object.

At block 4053, the second network device receives the subscription request of the collection object that is sent by the first network device.

At block 4054, the second network device sends the information about the collection object to the first network device based on the subscription request.

The subscription request carries an identifier of the collection object, and the second network device may report the information about the collection object to the first network device.

At block 4055, the first network device receives the information about the collection object that is sent by the second network device.

The first network device receives the information about the collection object that is sent by the second network device, to perform device management based on the information.

According to the method provided in this embodiment of this application, the network operation and maintenance data is labeled by using the self-explanation tag. This facilitates device management such as data collection and is not prone to errors, thereby not only achieving relatively high management accuracy, but also improving management efficiency.

In addition, the mechanism capability of the second network device is notified to the first network device through capability notification, so that management precision and management efficiency of the second network device by the first network device are further improved.

With the addition of upper-layer network monitoring, network monitoring data can be visualized in real time to quickly respond to network operation and maintenance requirements. According to the method provided in this embodiment of this application, development and maintenance costs can be further reduced, and a description of a Telemetry capability model can be directly converted by using the YANG model file in a running state to ensure same metadata during design and running.

Figure 9:
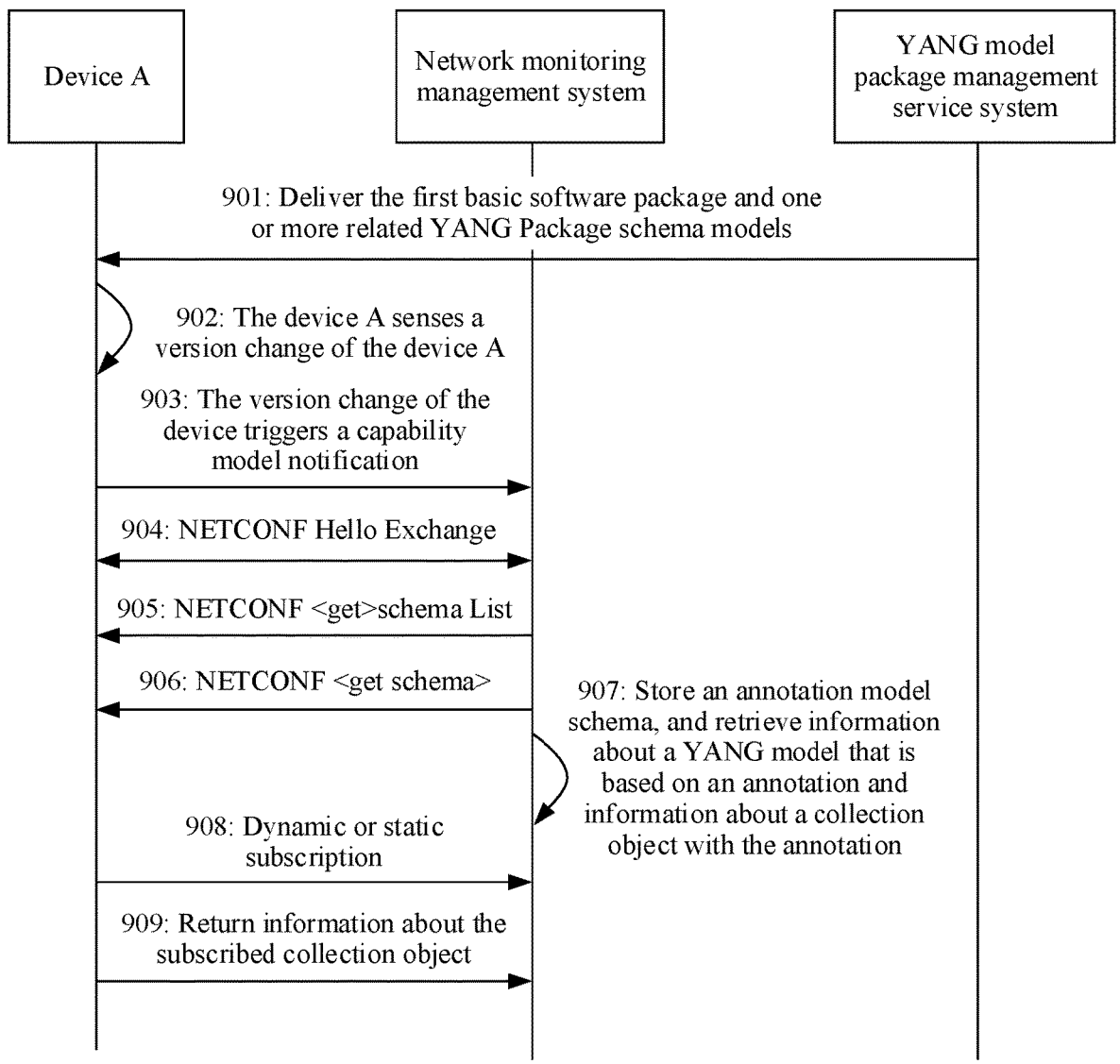
FIG. 9 is a schematic diagram of an interaction process for device management according to an embodiment of this application.

For ease of understanding, an interaction process of device management is described by using an example in which the first network device includes a network monitoring management system and a YANG model package management service system, and the second network device is a device A. As shown in FIG. 9, the device management method includes the following processes.

At block 901, the YANG model package management service system generates an OPM model annotation based model set and a corresponding Protocol file to form a software package, and downloads and installs the software package to a corresponding network device by using a package management module.

At block 902, the device A performs upgrade based on the software package, and the device A senses a change of a device version.

At block 903, the device A sends a Telemetry capability notification to the network monitoring management system (a collector), to notify XPATH path information of a collection object with an OPM annotation.

At blocks 904 to 906, the network monitoring management system establishes a NETCONF session with the device A, negotiates capabilities of the device and a network management system based on the NETCONF session, and queries the device for information about a list of all YANG models supported by the device.

For example, the network monitoring management system obtains a YANG model from the device A by using <get-schema>, the device A returns URL obtaining location information corresponding to the YANG model, and the network monitoring management system obtains, based on the URL obtaining location information, the information about the list of all the YANG models supported by the device.

At block 907, the network monitoring management system obtains and stores a service YANG model file that is based on the OPM annotation.

At block 908, the network monitoring management system initiates a subscription request to the device A based on the XPATH path information of the collection object corresponding to an OPM model.

At block 909, the device A returns the information about the subscribed collection object.

Figure 10:
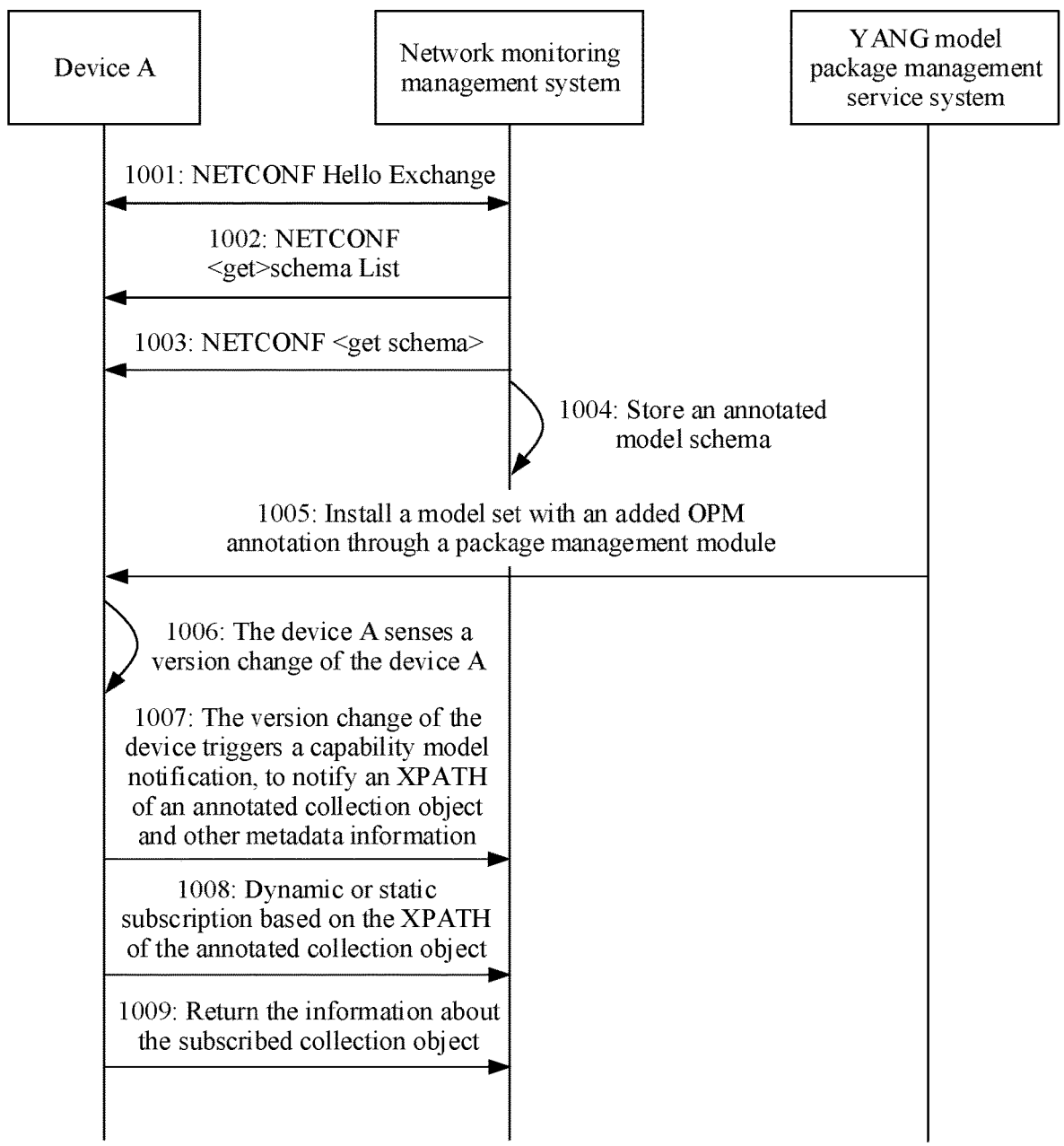
FIG. 10 is a schematic diagram of an interaction process for device management according to an embodiment of this application.

In an embodiment of this embodiment of this application, for the device management process shown in FIG. 9, a process in which the network monitoring management system establishes the NETCONF session with the device A may be further performed before the device A obtains an extended YANG model package. For example, as shown in FIG. 10, the device management method includes the following processes.

At blocks 1001 to 1003, the network monitoring management system establishes a NETCONF session with the device, negotiates capabilities of the device and a network management system based on the NETCONF session, and queries the device for information about a list of all YANG models supported by the device.

For example, the network monitoring management system obtains a YANG model from the device A by using <get-schema>, the device A returns URL obtaining location information corresponding to the YANG model, and the network monitoring management system obtains, based on the URL obtaining location information, the information about the list of all the YANG models supported by the device.

At block 1004, the network monitoring management system obtains and stores a service YANG model file that is based on an OPM annotation.

At block 1005, the YANG model package management service system generates an OPM model annotation based model set and a corresponding Protocol file to form a software package, and downloads and installs the software package to a corresponding network device by using a package management module.

At block 1006, the device A performs upgrade based on the software package, and the device senses a change of a device version.

At block 1007, the device A sends a Telemetry capability notification to the network monitoring management system (e.g., a collector), to notify XPATH path information of a collection object with an OPM annotation and other Schema information.

For example, whether the collection object is a performance indicator and an object type of the collection object are notified. Refer to content of the foregoing mechanism capability.

At block 1008, the network monitoring management system initiates a subscription request to the device A based on the XPATH path information of the collection object corresponding to an OPM model.

At block 1009, the device A returns the information about the subscribed collection object.

Figure 11:
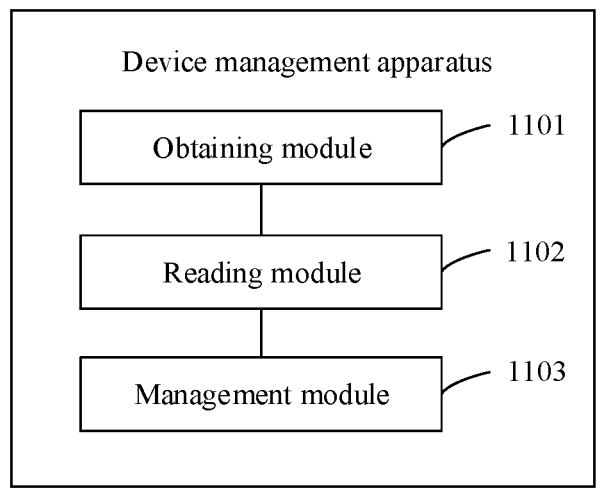
FIG. 11 is a schematic diagram of a structure of a device management apparatus according to an embodiment of this application.

An embodiment of this application provides a device management apparatus. The apparatus is used in a first network device. The first network device is the first network device in FIG. 4, FIG. 7, FIG. 9, and FIG. 10. Based on the following modules shown in FIG. 11, the device management apparatus shown in FIG. 11 can perform all or some of operations performed by the first network device. As shown in FIG. 11, the apparatus includes:
- an obtaining module 1101, configured to obtain an extended YANG model file from a second network device, where the extended YANG model file includes a self-explanation tag, and the self-explanation tag is used to label network operation and maintenance data;
- a reading module 1102, configured to obtain the self-explanation tag from the extended YANG model file; and
- a management module 1103, configured to manage the second network device based on the self-explanation tag.

In an embodiment, the management module 1103 is configured to: determine an XPATH path of a collection object in the second network device based on the self-explanation tag, where the XPATH of the collection object is used to describe an obtaining path of the collection object in the YANG model file; send a subscription request of the collection object to the second network device based on the XPATH path of the collection object; and receive information about the collection object that is sent by the second network device.

In an embodiment, the management module 1103 is configured to: obtain a network element driver package of the second network device based on the self-explanation tag, where the network element driver package is used to describe collection-related information of the second network device; and determine the XPATH path of the collection object in the second network device based on the collection-related information of the second network device.

In an embodiment, the management module 1103 is configured to: receive collection capability notification information sent by the second network device, where the collection capability notification information is used to indicate a mechanism capability of the second network device; and generate the network element driver package of the second network device based on the self-explanation tag and the mechanism capability of the second network device.

In an embodiment, the mechanism capability of the second network device includes one or more of a subscription mode of the second network device, a reporting protocol, an encryption protocol, an encoding/decoding mode, a supported collection object, information indicating whether conditional subscription is supported, a subscription condition, a quantity of supported sensors, and a quantity of extensible markup language path language XPATH paths to which each sensor can subscribe.

The apparatus provided in this embodiment of this application labels the network operation and maintenance data by using the self-explanation tag. This facilitates device management such as data collection and is not prone to errors, thereby not only achieving relatively high management accuracy, but also improving management efficiency.

In addition, the mechanism capability of the second network device is notified to the first network device through capability notification, so that management precision and management efficiency of the second network device by the first network device are further improved.

Figure 12:
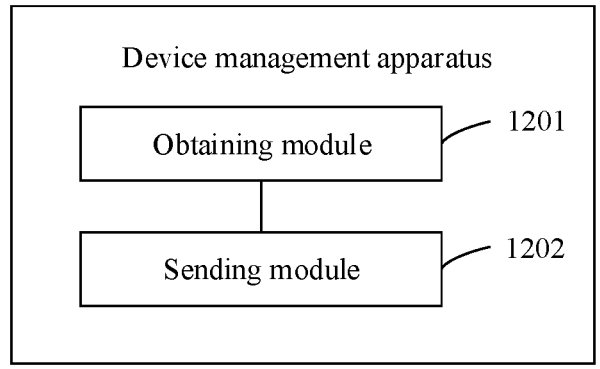
FIG. 12 is a schematic diagram of a structure of a device management apparatus according to an embodiment of this application.

An embodiment of this application provides a device management apparatus. The apparatus is used in a second network device. The second network device is the second network device in FIG. 4, FIG. 7, FIG. 9, and FIG. 10. Based on the following modules shown in FIG. 12 or FIG. 13, the device management apparatus shown in FIG. 12 or FIG. 13 can perform all or some of operations performed by the second network device. As shown in FIG. 12, the apparatus includes:
- an obtaining module 1201, configured to obtain an extended yet another next generation YANG model file, where the extended YANG model file includes a self-explanation tag, and the self-explanation tag is used to label network operation and maintenance data; and
- a sending module 1202, configured to send information about the extended YANG model file to the first network device.

In an embodiment, the sending module 1202 is configured to send the extended YANG model file to the first network device, or send a location of the extended YANG model file to the first network device.

Figure 13:
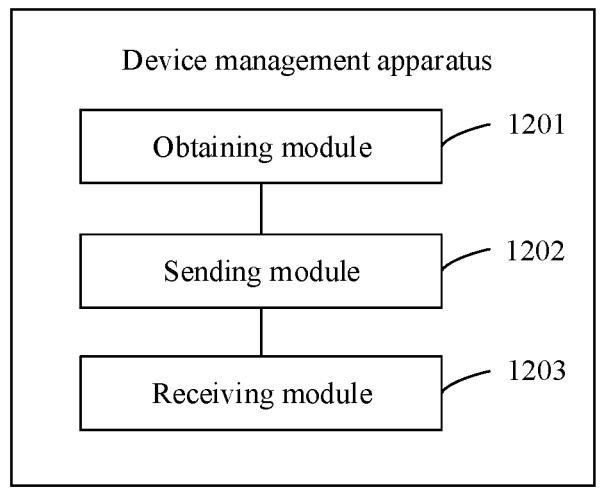
FIG. 13 is a schematic diagram of a structure of a device management apparatus according to an embodiment of this application.

In an embodiment, as shown in FIG. 13, the apparatus further includes:
- a receiving module 1203, configured to receive a subscription request of a collection object that is sent by the first network device, where
- the sending module 1202 is further configured to send information about the collection object to the first network device based on the subscription request.

In an embodiment, the sending module 1202 is further configured to send collection capability notification information to the first network device, where the collection capability notification information is used to indicate a mechanism capability of the second network device.

In an embodiment, the mechanism capability of the second network device includes one or more of a subscription mode of the second network device, a reporting protocol, an encryption protocol, an encoding/decoding mode, a supported collection object, information indicating whether conditional subscription is supported, a subscription condition, a quantity of supported sensors, and a quantity of extensible markup language path language XPATH paths to which each sensor can subscribe.

The apparatus provided in this embodiment of this application labels the network operation and maintenance data by using the self-explanation tag. This facilitates device management such as data collection and is not prone to errors, thereby not only achieving relatively high management accuracy, but also improving management efficiency.

In addition, the mechanism capability of the second network device is notified to the first network device through capability notification, so that management precision and management efficiency of the second network device by the first network device are further improved.

It should be understood that, when the apparatuses provided in FIG. 11 to FIG. 13 implement functions of the apparatuses, division into the functional modules is merely used as an example for description. During actual application, the foregoing functions may be allocated to different functional modules for implementation based on a requirement. In other words, an inner structure of a device is divided into different functional modules, to implement all or some of the functions described above. In addition, the apparatuses in the foregoing embodiments and the method embodiments are based on a same concept. For a specific implementation process, refer to the method embodiments, and details are not described herein again.

Figure 14:
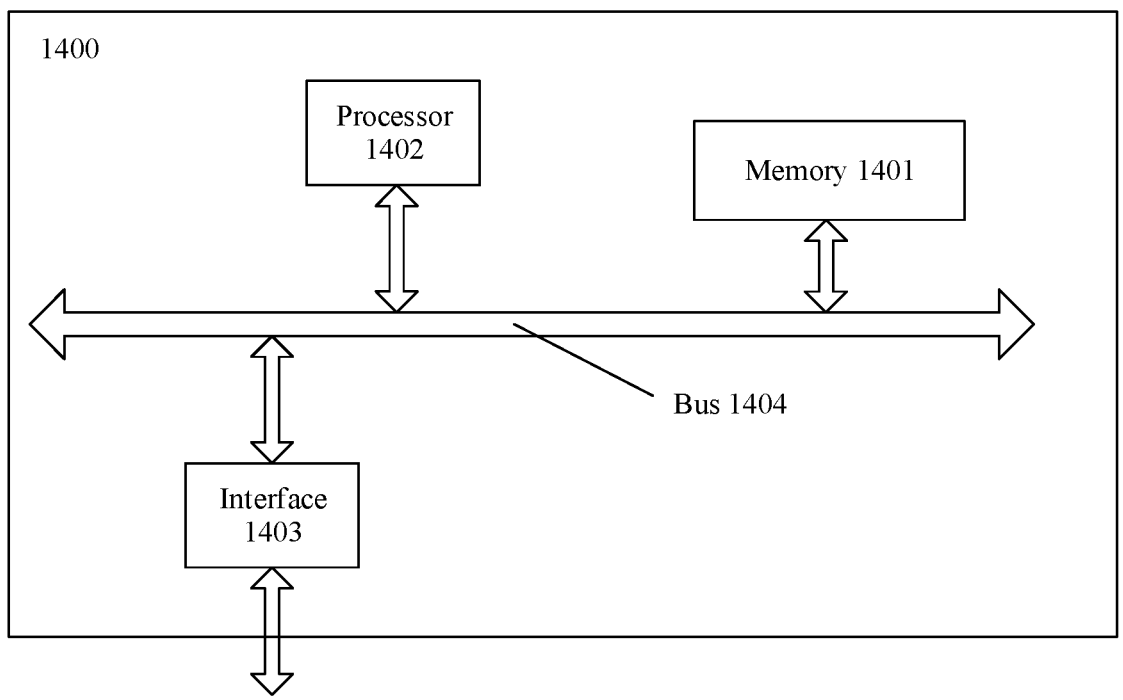
FIG. 14 is a schematic diagram of a structure of a network device according to an embodiment of this application.

Refer to FIG. 14. An embodiment of this application further provides a network device 1400. The network device 1400 shown in FIG. 14 is configured to perform operations related to the foregoing device management method. The network device 1400 includes a memory 1401, a processor 1402, and an interface 1403. The memory 1401, the processor 1402, and the interface 1403 are connected by using a bus 1404.

The memory 1401 stores at least one instruction, and the at least one instruction is loaded and executed by the processor 1402, to implement any one of the foregoing device management methods.

The interface 1403 is used for communication with another device in a network. The interface 1403 may implement communication in a wireless or wired manner. For example, the interface 1403 may be a network adapter. For example, the network device 1400 may communicate with a server by using the interface 1403.

For example, the network device shown in FIG. 14 is the first network device in FIG. 4, FIG. 7, FIG. 9, and FIG. 10. The processor 1402 reads the instruction from the memory 1401, to enable the network device shown in FIG. 14 to perform all or some of operations performed by the first network device.

For another example, the network device shown in FIG. 14 is the second network device in FIG. 4, FIG. 7, FIG. 9, and FIG. 10. The processor 1402 reads the instruction from the memory 1401, to enable the network device shown in FIG. 14 to perform all or some of operations performed by the second network device.

It should be understood that, FIG. 14 shows only a simplified design of the network device 1400. During actual application, the network device may include any quantity of interfaces, processors, or memories. In addition, the processor may be a central processing unit (CPU), or may be another general-purpose processor, a digital signal processor (DSP), an application-specific integrated circuit (ASIC), a field programmable gate array (FPGA), or another programmable logic device, a discrete gate or a transistor logic device, a discrete hardware component, or the like. The general-purpose processor may be a microprocessor, any conventional processor, or the like. It should be noted that the processor may be a processor that supports an advanced reduced instruction set computing machines (advanced RISC machines, ARM) architecture.

Further, in an optional embodiment, the memory may include a read-only memory and a random access memory, and provide instructions and data for the processor. The memory may further include a nonvolatile random access memory. For example, the memory may further store information about a device type.

The memory may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. By way of example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

A device management system is further provided. The system includes a first network device and a second network device. The first network device is configured to perform a function performed by the first network device in the foregoing device management method, and the second network device is configured to perform a function performed by the second network device in the foregoing device management method.

A computer-readable storage medium is further provided. The storage medium stores at least one instruction, and a processor loads and executes the instruction, to implement any one of the foregoing device management methods.

This application provides a computer program. When the computer program is executed by a computer, a processor or the computer may be enabled to perform corresponding operations and/or procedures in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk), or the like.

The foregoing descriptions are merely the embodiments of this application, but are not intended to limit this application. Any modification, equivalent replacement, or improvement made without departing from the spirit and principle of this application shall fall within the protection scope of this application.

What is claimed is:

1. A method performed by a first network device for managing devices, comprising:
   obtaining an extended yet another next generation (YANG) model file from a second network device, wherein the extended YANG model file is sent by the second network device and comprises a self-explanation tag used to label network operation and maintenance data of the second network device;
   obtaining the self-explanation tag from the extended YANG model file; and
   managing the second network device based on the self-explanation tag, including:
   determining an extensible markup language path language (XPATH) path of a collection object in the second network device based on the self-explanation tag;
   wherein the XPATH path of the collection object is used to describe an obtaining path of the collection object in the YANG model file;
   sending a subscription request of the collection object to the second network device based on the XPATH path of the collection object; and
   receiving information about the collection object that is sent by the second network device,
   wherein the determining an extensible markup language path language (XPATH) path of a collection object in the second network device based on the self-explanation tag comprises:
   obtaining a network element driver package of the second network device based on the self-explanation tag, comprising:
      receiving collection capability notification information sent by the second network device, wherein the collection capability notification information is used to indicate a mechanism capability of the second network device; and
      generating the network element driver package of the second network device based on the self-explanation tag and the mechanism capability of the second network device, wherein the network element driver package is used to describe collection-related information of the second network device.

2. The method according to claim 1, wherein the determining an extensible markup language path language (XPATH) path of a collection object in the second network device based on the self-explanation tag further comprises:
   determining the XPATH path of the collection object in the second network device based on the collection-related information of the second network device.

3. The method according to claim 2, wherein the mechanism capability of the second network device comprises one or more of a subscription mode of the second network device, a reporting protocol, an encryption protocol, an encoding/decoding mode, a supported collection object, information indicating whether conditional subscription is supported, a subscription condition, a quantity of supported sensors, or a quantity of XPATH paths to which each sensor can subscribe.

4. A device management apparatus, wherein the apparatus comprises:
   at least one processor;
   one or more memories coupled to the at least one processor and storing instructions which when executed by the at least one processor, to cause the apparatus to:
   obtain an extended yet another next generation (YANG) model file from a second network device, wherein the extended YANG model file is sent by the second network device and comprises a self-explanation tag used to label network operation and maintenance data of the second network device;
   obtain the self-explanation tag from the extended YANG model file; and
   manage the second network device based on the self-explanation tag, including:
   determine an extensible markup language path language (XPATH) path of a collection object in the second network device based on the self-explanation tag, wherein the XPATH path of the collection object is used to describe an obtaining path of the collection object in the YANG model file;
   send a subscription request of the collection object to the second network device based on the XPATH path of the collection object; and
   receive information about the collection object that is sent by the second network device,
   wherein the apparatus determines an extensible markup language path language (XPATH) path of a collection object in the second network device based on the self-explanation tag by:
      obtaining a network element driver package of the second network device based on the self-explanation tag, comprising:
      receiving collection capability notification information sent by the second network device, wherein the collection capability notification information is used to indicate a mechanism capability of the second network device; and
      generating the network element driver package of the second network device based on the self-explanation tag and the mechanism capability of the second network device, wherein the network element driver package is used to describe collection-related information of the second network device.

5. The apparatus according to claim 4, wherein the apparatus determines an extensible markup language path language (XPATH) path of a collection object in the second network device based on the self-explanation tag further by:
   determining the XPATH path of the collection object in the second network device based on the collection-related information of the second network device.

6. The apparatus according to claim 5, wherein the mechanism capability of the second network device comprises one or more of a subscription mode of the second network device, a reporting protocol, an encryption protocol, an encoding/decoding mode, a supported collection object, information indicating whether conditional subscription is supported, a subscription condition, a quantity of supported sensors, or a quantity of XPATH paths to which each sensor can subscribe.

7. A non-transitory storage medium storing a program, which when executed by one or more processors, cause the one or more processors to perform operations, the operations comprising:

obtaining, by a first network device, an extended yet another next generation (YANG) model file from a second network device, wherein the extended YANG model file is sent by the second network device and comprises a self-explanation tag used to label network operation and maintenance data of the second network device;

obtaining the self-explanation tag from the extended YANG model file; and managing the second network device based on the self-explanation tag, including:

determining an extensible markup language path language (XPATH) path of a collection object in the second network device based on the self-explanation tag, wherein the XPATH path of the collection object is used to describe an obtaining path of the collection object in the YANG model file;

sending a subscription request of the collection object to the second network device based on the XPATH path of the collection object; and receiving information about the collection object that is sent by the second network device, wherein the operation of determining an extensible markup language path language (XPATH) path of a collection object in the second network device based on the self-explanation tag comprises:

obtaining a network element driver package of the second network device based on the self-explanation tag, comprising:

receiving collection capability notification information sent by the second network device, wherein the collection capability notification information is used to indicate a mechanism capability of the second network device; and generating the network element driver package of the second network device based on the self-explanation tag and the mechanism capability of the second network device, wherein the network element driver package is used to describe collection-related information of the second network device.

8. The non-transitory storage medium according to claim 7, wherein the operation of determining an extensible markup language path language (XPATH) path of a collection object in the second network device based on the self-explanation tag further comprise:

determining the XPATH path of the collection object in the second network device based on the collection-related information of the second network device.

9. The non-transitory storage medium according to claim 8, wherein the mechanism capability of the second network device comprises one or more of a subscription mode of the second network device, a reporting protocol, an encryption protocol, an encoding/decoding mode, a supported collection object, information indicating whether conditional subscription is supported, a subscription condition, a quantity of supported sensors, or a quantity of XPATH paths to which each sensor can subscribe.

\* \* \* \* \*